July 8, 1941.　　　C. S. FRANKE　　　2,248,524
HEATING APPARATUS
Filed March 2, 1939　　　3 Sheets-Sheet 1
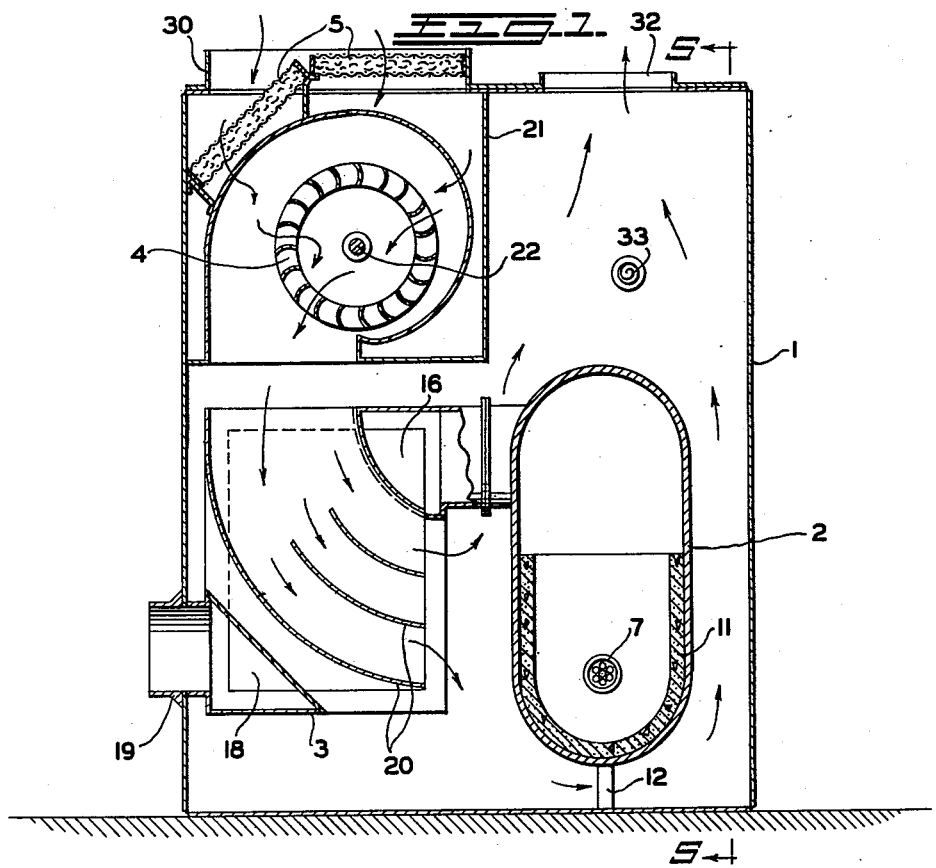
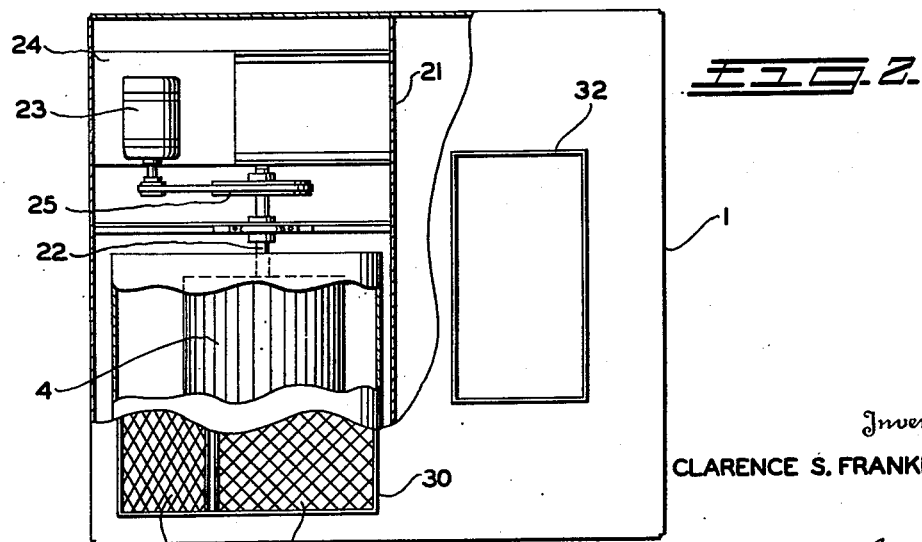
Inventor
CLARENCE S. FRANKE
By Semmes, Keegin & Semmes
Attorneys July 8, 1941.  C. S. FRANKE  2,248,524
HEATING APPARATUS
Filed March 2, 1939  3 Sheets-Sheet 2
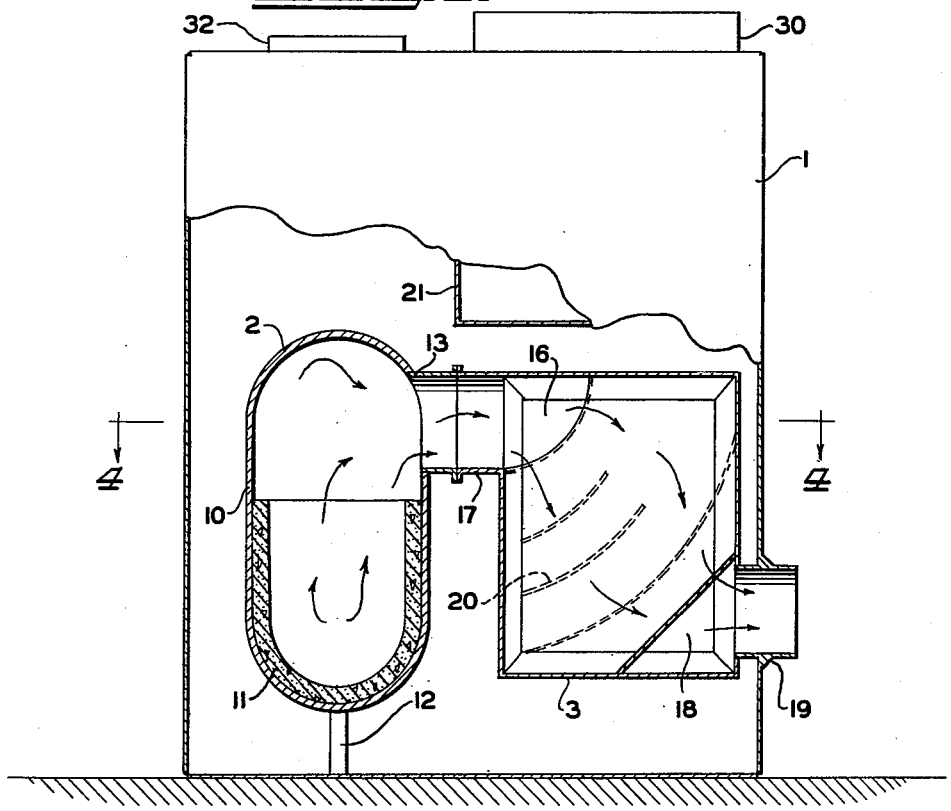
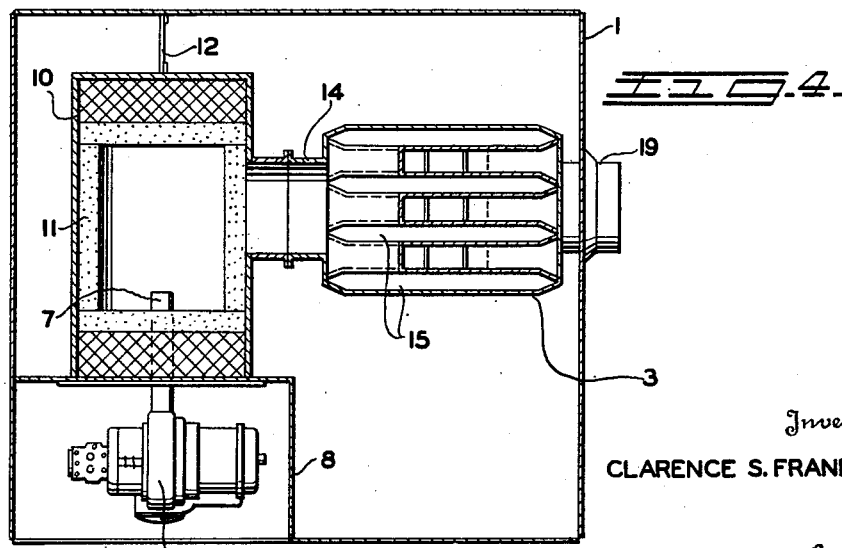
Inventor
CLARENCE S. FRANKE
By Semmes, Keegin & Semmes
Attorneys July 8, 1941. C. S. FRANKE 2,248,524
HEATING APPARATUS
Filed March 2, 1939   3 Sheets-Sheet 3
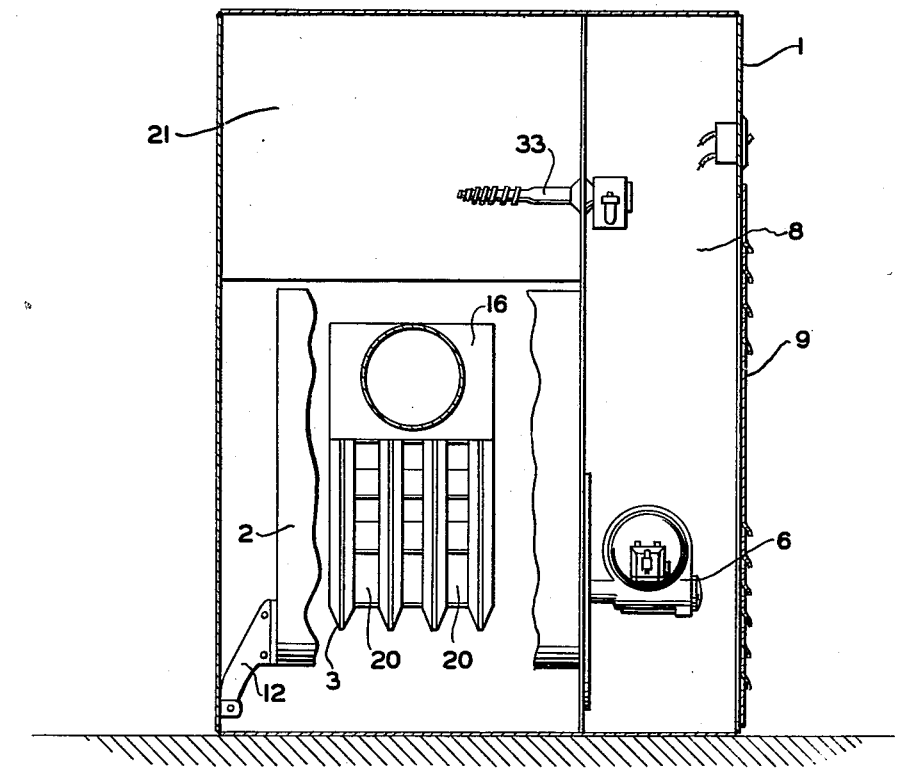
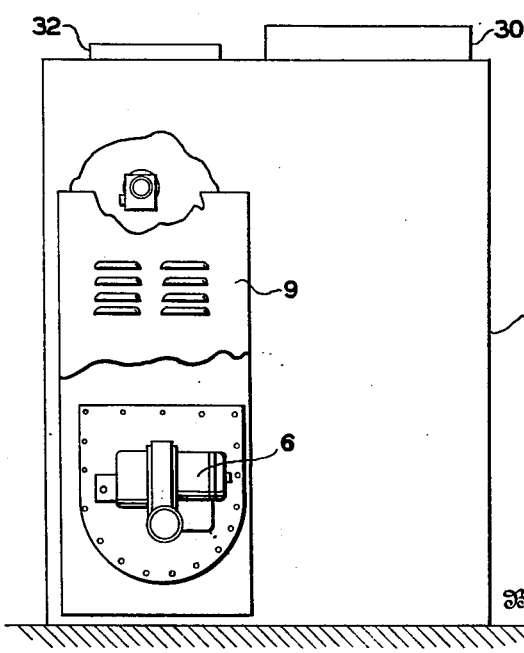
Inventor
CLARENCE S. FRANKE
By Semmes, Keegin & Semmes
Attorneys Patented July 8, 1941

2,248,524

UNITED STATES PATENT OFFICE 2,248,524

HEATING APPARATUS

Clarence Scott Franke, St. Louis, Mo.

Application March 2, 1939, Serial No. 259,435

4 Claims. (Cl. 126—110)

This invention relates to heating apparatus and more particularly has reference to warm air heating and delivering apparatus for buildings, and this application is a continuation in part of my co-pending application, Serial No. 45,819, filed October 19, 1935, for "Heating apparatus."

An object of the present invention is to provide a heating device employing a combustion chamber about which air may be circulated to utilize the heat generated within the combustion chamber to heat the forced circulation of air as the latter passes to the portion of the building to be heated.

A further object of the present invention is to provide a heating apparatus having a combustion chamber, a secondary heating surface, a blower, and a filter, the arrangement being such that the air moves in sequence past the filter, blower, secondary heating surface, and combustion chamber into the portion of the building to be heated.

Yet a further object of the present invention is to provide a heating apparatus in which the combustion chamber and secondary heating surface are so disposed with respect to each other that the air directed downwardly over the secondary heating surface will be directed over, around, and beneath the combustion chamber.

A still further object of the present invention is to provide a heating apparatus employing a combustion chamber, secondary heating element, and a blower, the blower being disposed at the inlet to the secondary heating surface so that the air in said inlet chamber will be maintained under pressure.

And yet a further object of the present invention is to provide a heating apparatus employing a combustion chamber, a secondary heating surface, a blower, and a filter, the filter being located at a point removed from the combustion chamber and secondary heating surfaces.

In order to accomplish the above and further objects, the present invention embraces the provision of a combustion chamber, a secondary heating surface, a blower disposed adjacent the intake to said secondary heating surface thereby maintaining the air in said chamber under pressure and a filter or filters located above the blower. Furthermore, the secondary heating surface is provided with directive fins which are used to direct the air over and around all portions of the combustion chamber.

The filter, by being disposed above the blower, removes all foreign substances in the air prior to the entry of the air into the heating apparatus.

In addition, the blower by being located adjacent the intake will enable the blower equipment to be kept cooler and therefore prolong the life of the blower equipment. Another advantage is that the location of the blower will insure that the filters will be well removed from the secondary heating surface, thereby obviating possible danger of conflagration.

In the drawings in which like numerals designate similar parts:

Figure 1 is a transverse sectional view of a heating apparatus embodying my invention.

Figure 2 is a top plan view, partly broken away, of the apparatus shown in Figure 1.

Figure 3 is a view in side elevation, partly in section, of the apparatus shown in Figures 1 and 2.

Figure 4 is a sectional view taken along line 4—4 of Figure 3.

Figure 5 is a sectional view taken along line 5—5 of Figure 1.

Figure 6 is a view in front elevation, partly broken away, showing the heating apparatus.

Referring to the drawings, and more particularly to Figure 1, there is shown a cabinet or casing 1 which may be made of heavy sheet steel or other suitable material. The cabinet preferably is made with inner and outer walls and an air cell asbestos insulation is disposed between said walls. Disposed within the cabinet 1 are a combustion chamber 2, secondary heating surfaces 3, a blower 4, and air filter 5. As shown in Figures 4 and 5, an oil burner 6 of any desirable construction is provided with a nozzle 7 that extends into the interior of the combustion chamber 2. The oil burner equipment is mounted within a separate compartment formed by the walls 8, and a door 9 located in the front wall of the casing 1 permits access to the oil burner compartment.

As clearly shown in Figures 3 and 4, the combustion chamber 2 is a horizontal metallic drum 10 which is supported above the floor of the cabinet 1 by means of supporting legs 12. The drum is, of course, provided with the usual fire box 11 made of refractory material and the drum is provided with an outlet mouth 13 at its upper portion.

The secondary heating element 3 consists of a plurality of vertically arranged hollow sections or radiators 15. The upper extremities of the hollow sections 15 are in communication with a header 16 having formed therewith a mouth 17 that is attached to the mouth 13 of the combustion chamber 2 in any desirable manner. The lower rear portion of the secondary heating surface is also provided with a header 18 having an outlet 19 which extends through the wall of the cabinet 1 and is in communication with the atmosphere.

Referring to Figure 3, it can be seen that the products of combustion leaving the combustion chamber 2 will pass through the connections 13 and 17 into the hollow sections 15 of the secondary heating member and will pass therethrough into the header 18 and out through the outlet pipe 19 into the atmosphere. As shown in Figures 1 and 5, a plurality of deflecting fins or vanes 20 are positioned between the vertically disposed sections 15 for directing the incoming air (as will later be more fully discussed) against, around, and over the combustion chamber 2.

The blower 4, as clearly illustrated in Figure 1, is located above the secondary heating element within a compartment designated 21. The blower 4 is a full-floating, rotor, centrifugal type blower and is supported by a shaft 22 installed in sleeve type bearings, mounted on a suitable angle iron frame carried on the base of the blower compartment on rubber cushions. The blower is driven by an electric motor 23 disposed on a shelf 24 within the compartment 21 by means of a V-type belt drive indicated 25. I have found that locating the blower 4 above the secondary heating chamber 3 will keep the blower equipment, that is, the fan, bearings, motor, etc., cooler, thereby prolonging the life of the equipment and particularly the electric motor 23. In addition, this arrangement of the blower will insure that the filter 5 will be well removed from the secondary heating element 3, thereby preventing the possible danger of fire. Another very important factor is that by having the blower located adjacent the air intake, the air in the chamber will be under pressure and in the event of any cracks or leakage which may develop from use or wear in the secondary heating member, there will be no leakage of the products of combustion into the air stream for the house, but rather the pressure of the air will force the air into the secondary heating member. It can be seen in Figure 1 that the filters 5 are disposed within an aperture 30 formed in the upper wall of the casing 1. These filters are located immediately above the blower 4 and can be removably affixed by any desirable means. I prefer to employ the viscous type air filter, and dirt in the air, particularly soot and carbons are collected and retained by successive impingements on the oil coated surfaces. The filter is progressively packed, providing relatively larger spaces for the collection of foreign substances on the top portion where the bulk of the solids is taken out without undue increase in resistance, while at the back of the filter the openings are smaller which removes the finer dust particles.

An outlet opening 32 is formed in the top wall of the cabinet above the combustion chamber 2, and the hot air conduit pipe leading to the rooms to be heated can be suitably attached thereto.

It can also be seen that an automatic blower control designated 33 extends into the circulating chamber and is controlled by the temperature therein. The exterior portion of the automatic blower control 33 is located within the compartment 8 and is readily accessible through the door 9.

While the operation of my heating apparatus is believed to be obvious from the foregoing description, briefly the operation is as follows: When the motor 23 is in operation, the blower 4 will force air downwardly and between the sections 15 of the secondary heating element 3, and the vanes 20 will direct the air around, underneath, and over the combustion chamber 2. The pre-heated air will thus pass upwardly through the outlet 31 and thence be directed into the room or rooms to be heated in any desirable manner. The blower, by being located at the air intake inlet will maintain the air in the inlet chamber under pressure, and this is particularly efficacious in the event any cracks should occur in the secondary heating element. The air in this chamber by being under pressure will prevent the leakage of the combustion gases into the air stream and will force the air into the secondary heating element.

Furthermore, by using a horizontal drum that is supported above the floor of the cabinet as a combustion chamber, and having the secondary heating element provided with directive fins, the incoming air will be distributed uniformly over the entire surface of the horizontal drum. Manifestly, this will make for a more efficient combustion chamber, as the entire surface of the drum constitutes a heating surface for the air.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. In an air heating system; a cabinet; air intake and air delivery openings in the cabinet; a combustion chamber supported above the bottom of the cabinet below the hot air delivery opening; a secondary heating member comprising a plurality of vertically disposed hollow sections located beneath the air intake opening; an exhaust pipe extending from the upper portion of the combustion drum and in communication with the upper portion of the secondary heating member; a second exhaust pipe; one extremity of which communicates with the lower portion of the secondary heating member and the other extremity being in communication with the atmosphere; a blower located in the cabinet above the secondary heating member for forcing air downwardly into contact with said secondary heating element; and fins disposed between the vertically disposed hollow sections for directing air diagonally through said secondary heating member and around, beneath and over said combustion chamber.

2. In an air heating system; a cabinet; air intake and hot air delivery openings in the cabinet; a combustion chamber below the air delivery opening; said combustion chamber being supported above the bottom of the cabinet; a secondary heating member below the air intake opening; means connecting said combustion chamber and said secondary heating member; a blower mounted in the cabinet above the secondary heating member for blowing air downwardly into contact with said secondary heating member; and fins associated with said secondary heating member for directing the air diagonally through said secondary heating member and around, beneath, and over said combustion chamber.

3. In an air heating system; a cabinet; air intake and hot air delivery openings in the cabinet; a combustion chamber below the air delivery opening; said combustion chamber being supported above the bottom of the cabinet; a secondary heating member below the air intake opening and supported above the bottom of the cabinet; an exhaust pipe extending from the upper portion of the combustion chamber and in communication with the upper portion of the secondary heating member; a blower in the cabinet positioned above the secondary heating member for directing air into contact with said secondary heating member and maintaining the same under pressure; and fins associated with said secondary heating member for directing the air diagonally through said secondary heating member and around, beneath, and over the combustion chamber.

4. In an air heating system; a cabinet; air delivery openings in the cabinet; a horizontally extending combustion chamber supported above the bottom of the cabinet below the air delivery opening; a secondary heating member comprising a plurality of vertically disposed hollow sections supported above the bottom of the cabinet and disposed beneath the air intake opening; an exhaust pipe extending from the upper portion of the combustion drum and in communication with the upper portion of said secondary heating member; a second exhaust pipe; one end of which communicates with the lower portion of the secondary heating member and the other end being in communication with the atmosphere; a blower located in the cabinet above the secondary heating member for directing air downwardly into contact with the secondary heating member and maintaining the same under pressure; and guide means positioned between said vertically disposed hollow sections to direct the air diagonally through the secondary heating member and around, beneath, and over said combustion chamber.

CLARENCE SCOTT FRANKE.